(12) United States Patent
Shi et al.

(10) Patent No.: US 8,230,063 B2
(45) Date of Patent: Jul. 24, 2012

(54) USER DATA SERVER SYSTEM, METHOD AND APPARATUS

(75) Inventors: Guangyu Shi, Shenzhen (CN); Lingyuan Fan, Shenzhen (CN); Jian Chen, Shenzhen (CN); Hao Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 12/829,752

(22) Filed: Jul. 2, 2010

(65) Prior Publication Data

US 2010/0268820 A1 Oct. 21, 2010

Related U.S. Application Data

(63) Continuation of application No. PCT/CN2009/070064, filed on Jan. 7, 2009.

(30) Foreign Application Priority Data

Feb. 5, 2008 (CN) .......................... 2008 1 0065356
Feb. 29, 2008 (CN) .......................... 2008 1 0080991

(51) Int. Cl.
*G06F 15/173* (2006.01)
*G06F 15/16* (2006.01)
*H04L 12/28* (2006.01)

(52) U.S. Cl. ........ 709/224; 709/205; 709/223; 709/243; 370/254; 370/352

(58) Field of Classification Search .................. 709/223, 709/224
See application file for complete search history.

(56) References Cited

U.S. PATENT DOCUMENTS 7,684,352 B2 * 3/2010 Smith et al. .................. 370/255
(Continued)

FOREIGN PATENT DOCUMENTS

CN 1329791 A 1/2002
(Continued)

OTHER PUBLICATIONS

International Search Report, mailed Apr. 9, 2009, in corresponding International Application PCT/CN2009/070064 (4 pp.).

(Continued)

*Primary Examiner* — Wing Chan
*Assistant Examiner* — David X Yi
(74) *Attorney, Agent, or Firm* — Staas & Halsey LLP

(57) ABSTRACT

A user data server system includes: a data storage node, which stores user data, registers the user data in a Distributed Hash Table (DHT) network by using a key, and receives and processes user data operation requests; a DHT index node, which creates and maintains DHT routing information according to a DHT algorithm and stores information of data storage nodes where user data is stored according to the key and searches for information of a data storage node where target user data is stored according to the key; a DHT super maintenance node, which manages and optimizes the DHT network; and a front end node capable of protocol processing and service processing, which obtains a key associated with a target user and obtains information of a data storage node where the target user data is stored by querying the DHT index node via the DHT network according to the key, and performs operations on the user data stored in the data storage node where the target user data is stored. With the technical solution provided by the present invention, a user data server is not centralized and is highly scalable and highly reliable with a high cost-effectiveness.

7 Claims, 5 Drawing Sheets

U.S. PATENT DOCUMENTS

| | | | |
|---|---|---|---|
| 7,984,182 B2 * | 7/2011 | Suzuki et al. | 709/241 |
| 2005/0063318 A1 * | 3/2005 | Xu et al. | 370/254 |
| 2006/0098588 A1 | 5/2006 | Zhang et al. | |
| 2006/0209717 A1 * | 9/2006 | Sharma et al. | 370/254 |
| 2007/0002869 A1 * | 1/2007 | Miller | 370/395.32 |
| 2007/0283043 A1 * | 12/2007 | Kiyohara et al. | 709/243 |
| 2008/0130516 A1 * | 6/2008 | You et al. | 370/254 |
| 2009/0316687 A1 * | 12/2009 | Kruppa | 370/352 |

FOREIGN PATENT DOCUMENTS

| | | |
|---|---|---|
| CN | 1859115 | 11/2006 |
| CN | 101030866 | 9/2007 |
| CN | 101043695 | 9/2007 |
| CN | 101047550 | 10/2007 |
| CN | 101505472 B | 7/2011 |
| WO | 0033533 A1 | 6/2000 |
| WO | WO 2007/106791 | 9/2007 |

OTHER PUBLICATIONS

Office Action, mailed Feb. 5, 2010, in corresponding Chinese Application 200810080991.3 (18 pp.).

Li, D. et al., *FISSIONE: A Scalable Constant Degree and Low Congestion DHT Scheme Based on Kautz Graphs*, 24th Annual Joint Conference on the IEEE Computer and Communications Societies, Mar. 13, 2005, pp. 1677-1688.

Extended European Search Report, mailed Dec. 22, 2010, in corresponding European Application No. 09709540.0 (11 pp.).

Written Opinion mailed Apr. 9, 2009 in corresponding International Application No. PCT/CN2009/070064 (3 pp.).

* cited by examiner

USER DATA SERVER SYSTEM, METHOD AND APPARATUS

CROSS-REFERENCE TO RELATED APPLICATIONS

This application is a continuation of International Application No. PCT/CN2009/070064, filed on Jan. 7, 2009, which claims priority to Chinese Patent Application No. 200810080991.3, filed on Feb. 29, 2008 and Chinese Patent Application No. 200810065356.8, filed on Feb. 5, 2008, all of which are hereby incorporated by reference in their entireties.

FIELD OF THE INVENTION

The present invention relates to electronic communications technologies, and in particular, to a user data server system, method and apparatus.

BACKGROUND OF THE INVENTION

A large number of user data servers are deployed in a telecommunications network. With its structure shown in FIG. 1, a user data server is configured to store user information, such as number information, authentication information, service subscription information, location information, network properties and policies. User data servers are such as: a Home Location Register (HLR) in a Global System for Mobile Communications (GSM), a Home Subscriber Server (HSS) in an IP Multimedia Subsystem (IMS) evolving from the HLR, and an Authentication, Authorization and Accounting (AAA) server in a broadband access system.

During the implementation of the present invention, the inventor discovers at least the following weakness in the prior art:

At present, those user data servers mainly work in centralized storage mode, where a centralized data storage system stores user data in a uniform manner. However, with the constant increase of users, the centralized storage mode has gradually shown its defects, such as bad scalability.

SUMMARY OF THE INVENTION

Embodiments of the present invention provide a user data server system, method and apparatus to improve scalability and relieve pressure coming with the increase of user data.

A user data server system includes:
a data storage node, configured to: store user data, register the user data in a Distributed Hash Table (DHT) network by using a key, and receive and process user data operation requests;
a DHT index node, configured to: create and maintain DHT routing information according to a DHT algorithm, store, according to the key, information of data storage nodes where user data is stored, and search for, according to the key, information of a data storage node where target user data is stored;
a DHT maintenance node, configured to: manage and optimize the DHT network; and
a front end node, capable of protocol processing and service processing, and configured to: obtain a key associated with a target user and obtain information of a data storage node where the target user data is stored by querying the DHT index node, via the DHT network according to the key, and perform operations on the user data stored in the data storage node where the target user data is stored.

A method for requesting a user data operation includes:
by a front end node, receiving a service request, performing protocol processing and service processing, and obtaining a key associated with a target user;
by the front end node, acting as a client node in a DHT network to initiate a key-based DHT query request to a DHT index node connected with the front end node and receiving information of a data storage node where target user data is stored from the DHT index node; and
sending, by the front end node, a user data operation request to the data storage node according to the information of the data storage node where the target user data is stored.

A DHT index node includes a DHT constructing module, a DHT route searching module and a DHT index module, where:
the DHT constructing module is configured to create and maintain DHT routing information according to a DHT algorithm;
the DHT route searching module is configured to: receive a query request from a front end node or another DHT index node and search for a node ID closest to a key in the DHT routing information; if the closest node ID is the local node ID, search for the target index in the local DHT index module and send information of a data storage node where target user data is stored to the front end node; if the closest node ID is not the local node ID, send a DHT query request to a DHT index node associated with the closest node ID; and
the DHT index module is configured to: receive a registration request from a data storage node and store information of the data storage node where user data is stored.

A front end node includes:
a protocol processing module, configured to perform protocols between a user data server and a function entity; and
a service processing module, configured to perform services processing in a scenario in which the user data server processes services, obtain a key associated with a target user of the services and act as a client node in a DHT network to query a DHT index node via the DHT network according to the key so as to obtain information of a data storage node where target user data is stored, and perform operations on the user data stored in the data storage node.

Compared with the prior art, the technical solution provided in the embodiments of the present invention effectively solves the issues that a user data server working in centralized storage mode is faced with. As multiple index nodes provide the data query service for a front end node, the user data server is not centralized and is highly scalable and highly reliable with a high cost-effectiveness.

DETAILED DESCRIPTION OF THE INVENTION

Figure 1:
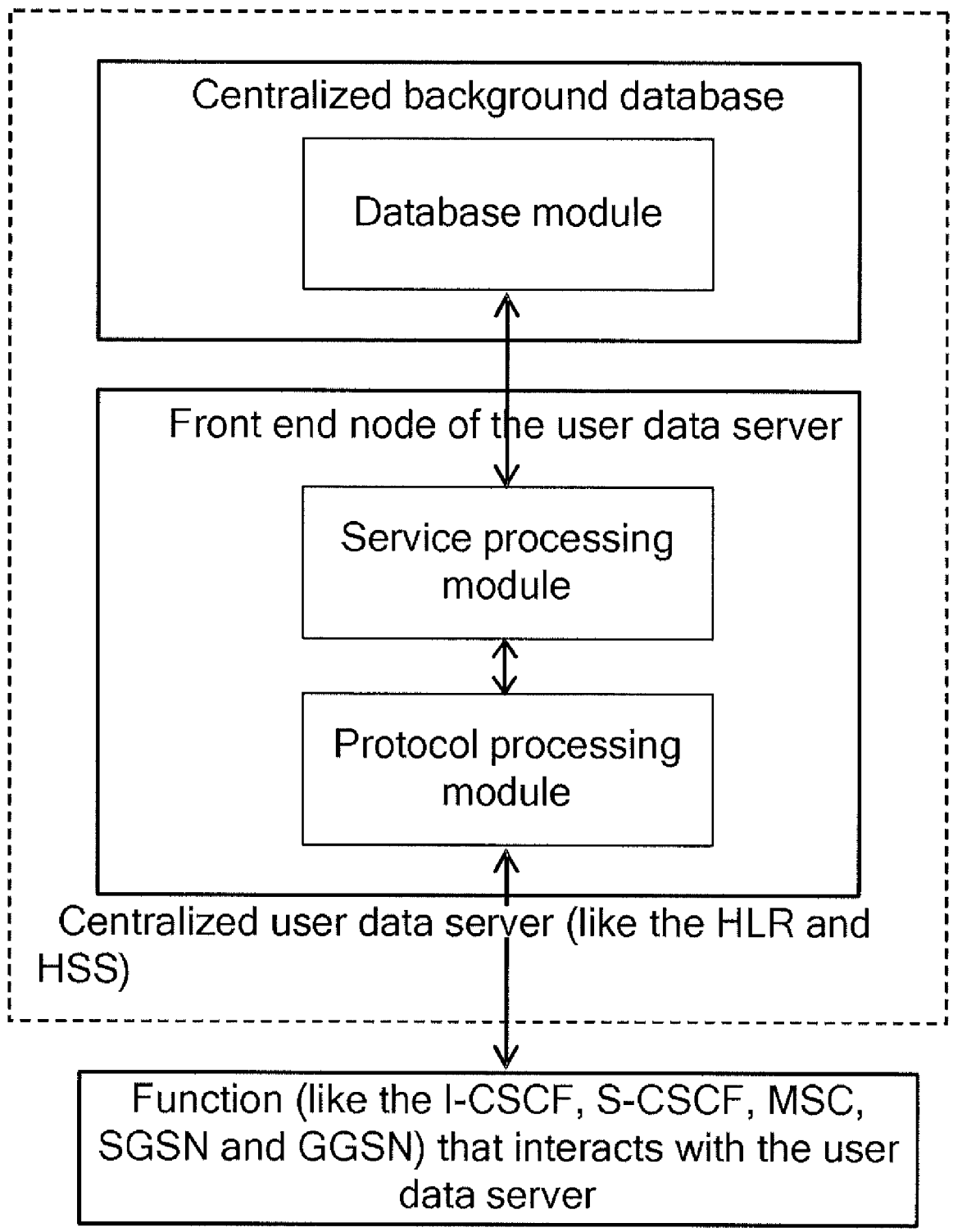
FIG. 1 is a schematic diagram of a centralized user data server in a prior art.

A Peer-to-Peer (P2P) network is a distributed network that is a breakthrough from the traditional Client/Server (C/S) mode. In a P2P network, all nodes are in an equal position. One node acts as a server to provide services for other nodes while enjoying services provided by other nodes. The P2P network is not centralized. It is highly scalable and has a high cost-effectiveness.

An embodiment of the present invention applies the advantages of a P2P system to a user data server in a telecommunication network and provides a distributed user data server system based on a P2P architecture. The purpose is to overcome the weakness of centralized storage and enable a P2P system to achieve carrier-class performance (such as 99.999% availability, high reliability, and real-time data operations) so that the user data server system is non-centralized and highly scalable with a high cost-effectiveness and carrier-class performance.

The user data server system according to an embodiment of the present invention includes a data storage node, a DHT index node, a DHT super node, a DHT super maintenance node, and a front end node.

The data storage node is configured to: store user data, register the user data in a Distributed Hash Table (DHT) network by using a key, and receive and process user data operation requests. The choice of the key depends on the application scenario of the user data server. For example, in the case of HSS, the key may be an IMS subscription ID, an IP Multimedia Private Identity (IMPI) or an IP Multimedia Public Identity (IMPU). One piece of user data may be registered in the DHT network respectively by using different keys.

The DHT index node is configured to: create and maintain DHT routing information according to a DHT algorithm and store, according to the key, information of data storage nodes where user data is stored and search for, according to the key, information of a data storage node where target user data is stored. The system provided in the embodiment of the present invention is mainly applicable to telecommunications networks where nodes are stable. The DHT index node controls the size of routing information automatically according to the network size and the stability of nodes so as to ensure that a query operation is complete within 1-K hops, where K is configurable, such as 3.

The DHT super node includes multiple virtual DHT index nodes and multiple virtual data storage nodes. The DHT super node is configured to manage DHT routing information in a wider range and store more user data.

The DHT super maintenance node is configured to manage and optimize the DHT network. Multiple DHT super maintenance nodes may be distributed geographically. The DHT super maintenance node provides the following functions: allocating IDs for DHT nodes, and particularly, data storage nodes or DHT index nodes; monitoring the status of DHT nodes in the served area; receiving update routing information of DHT nodes in its controlled area and forwarding the update routing information to super maintenance nodes in other areas, and receiving update routing information from other super maintenance nodes and notifying DHT nodes in its controlled area to update routing information; checking load conditions of nodes in its controlled area by sampling load conditions and realizing load balance by specifying join positions of new nodes.

The front end node is configured to: perform specific protocol processing and service processing, and obtain information of a data storage node where target user data is stored by means of DHT query, and perform operations on the user data stored in the data storage node.

The above logical functions may be mapped into independent physical devices or any combination of the functions may be located in one physical device, or they exist in one physical device as independent processes or as one process. In addition, the user data server system may include no DHT super node.

Figure 2:
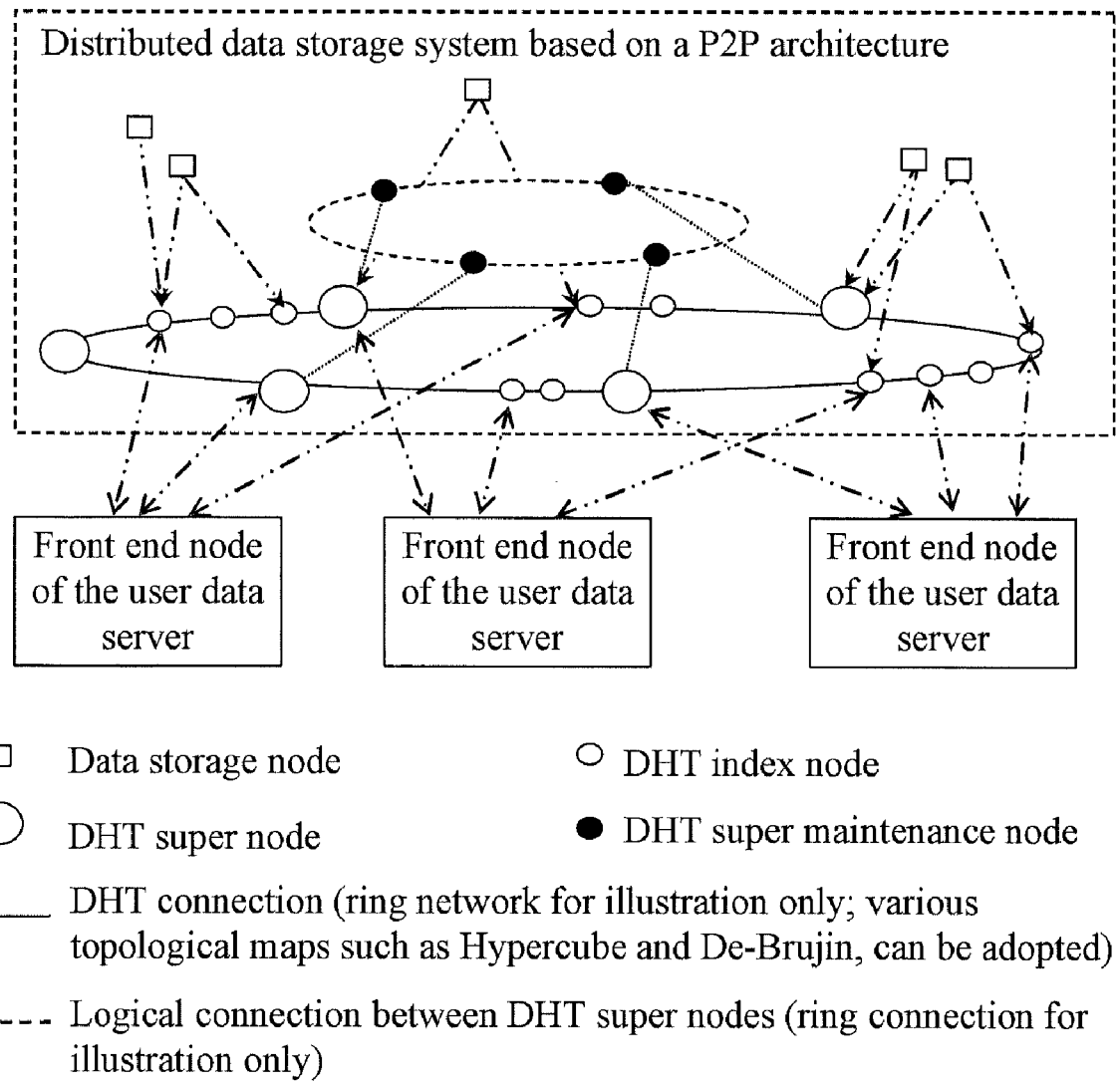
FIG. 2 is a schematic diagram of a user data server system according to an embodiment of the present invention.
Figure 3:
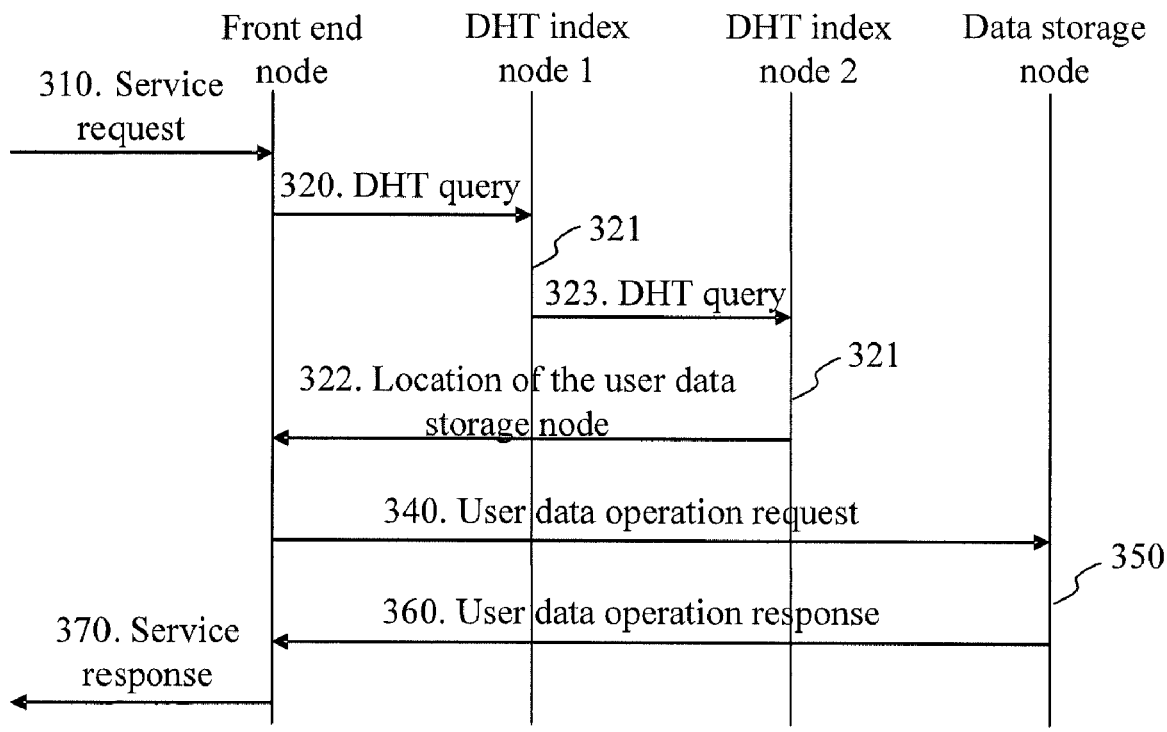
FIG. 3 shows a process of requesting a user data operation in a user data server system according to an embodiment of the present invention.

FIG. 2 is a schematic diagram of the above user data server system. In the user data server system shown in FIG. 2, the process of requesting a user data operation is shown in FIG. 3. The process includes the following steps:

Step 310: The front end node receives a service request (such as a registration request, an authentication request, and a location update request), performs protocol processing and service processing to obtain an ID of the target user of the service request and obtain a key according to the user ID.

The service request is from a function entity that has interactions with the user data server in the application scenario of the user data server. For example, in a GSM or General Packet Radio Service (GPRS) scenario, the request is from a Mobile Switching Center (MSC), Gateway Mobile Switching Centre (GMSC), Serving GPRS Support Node (SGSN), or Gateway GPRS Support Node (GGSN) that has interactions with an HLR; in an IMS scenario, the request is from an Interrogating-Call/Session Control Function (I-CSCF) or Serving-Call/Session Control Function (S-CSCF) that has interactions with an HSS. The specific type of the service request is a message that can be received by the user data server in such scenarios. For example, the HSS receives a registration request in the IMS scenario; the HLR receives a location update request in the GSM scenario.

The key is obtained by means of a compatible hash algorithm according to the user ID.

Step 320: The front end node acts as a client node in the DHT network and initiates a key-based DHT query to a DHT index node connected with the front end node to find a data storage node where the target user data is stored in the DHT network.

Step 321: The DHT index node searches for a node ID closest to the key in DHT routing information; if the node ID is the ID of the local node, the target index is in the indexes stored in the local DHT index node and step 322 is executed; if the node ID is not the ID of the local node, step 323 is executed.

Step 322: The DHT index node searches for the target index in the indexes stored in the DHT index node and sends information of the data storage node where the user data is stored to the front end node.

Step 323: The DHT index node initiates a DHT query to a DHT index node associated with the node ID closest to the key; the new DHT index node executes step 321 after receiving the DHT query request.

Step 340: According to the received information of the data storage node where the target user data is stored in step 322, the front end node sends a user data operation request to the data storage node.

Step 350: The data storage node performs an operation according to the user data operation request.

Step 360: The data storage node sends a user data operation response to the front end node.

Step 370: The front end node receives the user data operation response from the data storage node and completes subsequent service processing and protocol processing, and sends a corresponding service response (such as a registration response, an authentication response, and a location update response) to the requesting function.

If the scenario in which the user data server processes services does not require a user data operation response or a service response, steps 360 and 370 can be omitted.

An embodiment of the present invention provides another distributed user data server system. The system includes a data storage node, a DHT index node, a DHT super node, a DHT super maintenance node, and a front end node.

The data storage node is configured to: store user data and register the user data in a DHT network as a client node by using a key, and receive and process user data operation requests.

Figure 4:
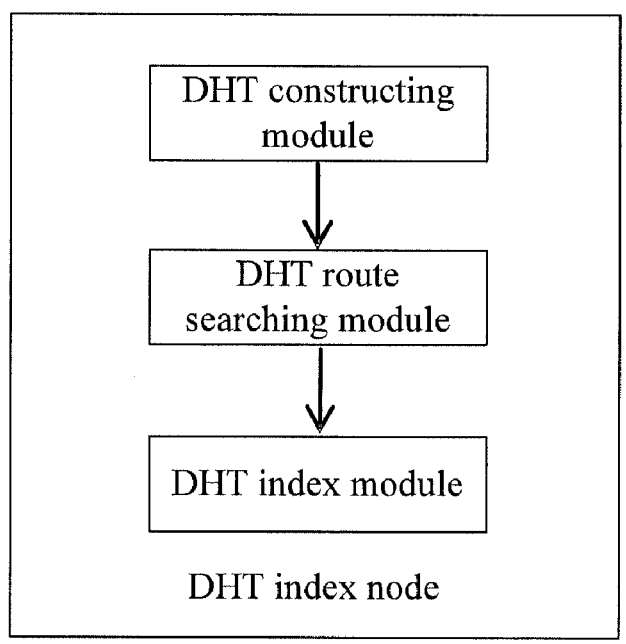
FIG. 4 is a schematic diagram of a DHT index node according to an embodiment of the present invention.

The DHT index node includes a DHT constructing module, a DHT route searching module and a DHT index module, as shown in FIG. 4. The DHT constructing module creates and maintains DHT routing information according to a DHT algorithm. The DHT route searching module receives a query request from the front end node or another DHT index node and searches for a node ID closest to the key in the DHT routing information. If the closest node ID is the local node ID, the target index is in the indexes stored in the local DHT index module and the DHT route searching module searches for the target index in the local DHT index module and sends information of the data storage node where the target user data is stored to the front end node. If the closest node ID is not the local node ID, the target index is not in the indexes stored in the local DHT index module and the DHT route searching module proceeds to send a DHT query request to a DHT index node associated with the closest node ID. The DHT index module receives a registration request from the data storage node and stores information of the data storage node where user data is stored.

Figure 5:
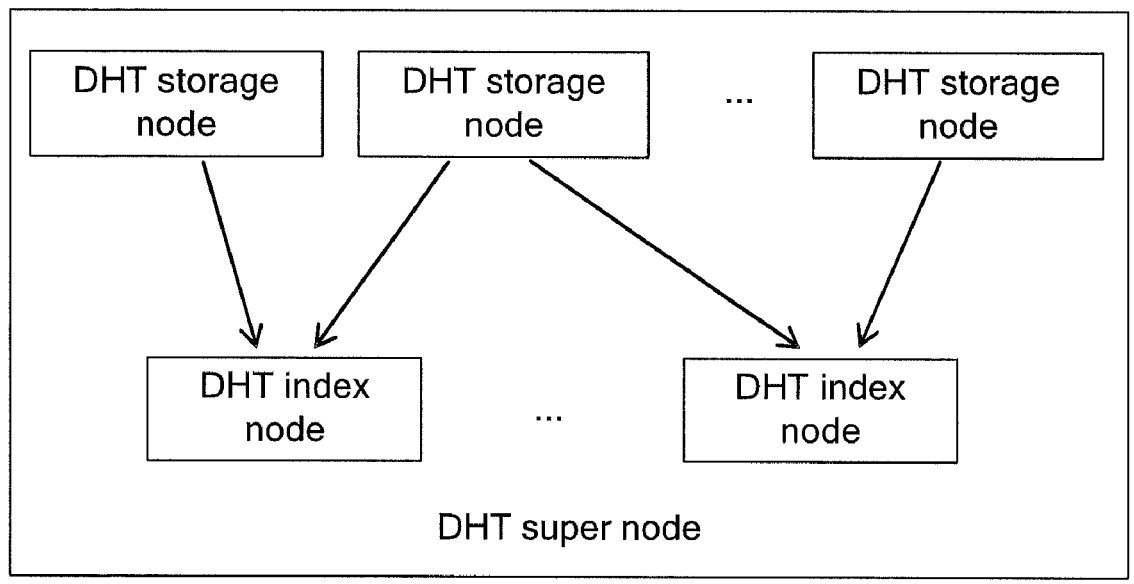
FIG. 5 is a schematic diagram of a DHT super node according to an embodiment of the present invention.

The DHT super node includes multiple virtual DHT index nodes and multiple virtual data storage nodes. The DHT super node, as shown in FIG. 5, is configured to manage DHT routing information in a wider range and store more user data.

The DHT super maintenance node is configured to manage and optimize the DHT network.

Figure 6:
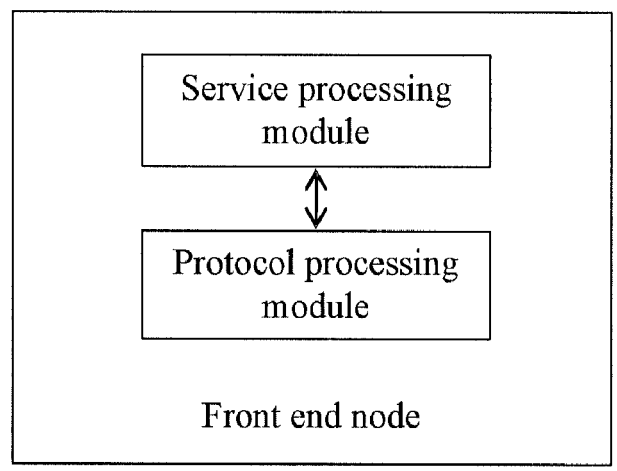
FIG. 6 is a schematic diagram of a front end node according to an embodiment of the present invention.

The front end node includes a protocol processing module and a service processing module, as shown in FIG. 6. The protocol processing module performs protocol interactions between the user data server and other functions (such as the MSC, I-CSCF, and S-CSCF); the service processing module performs service processing (such as registration, location update and authentication) in a scenario in which the user data server processes services and obtains information of a data storage node where the target user data is stored via a DHT query as a client node in the DHT network, and performs operations on the user data stored in the data storage node.

The above nodes can be flexibly combined according to operator requirements to construct different physical devices, such as an integrated user data server device, which means the above data storage node, DHT index node and front end node are integrated in one physical device; or the above data storage node, DHT index node and DHT super maintenance node are integrated in one physical device.

An embodiment of the present invention also provides a communication network, including a user data server system that includes:

- a data storage node, configured to: store user data, register the user data in a DHT network by using a key, and receive and process user data operation requests;
- a DHT index node, configured to: create and maintain DHT routing information according to a DHT algorithm and store, according to the key, information of data storage nodes where user data is stored, and search for, according to the key, information of a data storage node where target user data is stored;
- a DHT super maintenance node, configured to: manage and optimize the DHT network; and
- a front end node, configured to: perform specific protocol processing and service processing, and obtain information of a data storage node where target user data is stored by means of DHT query, and perform operations on the user data stored in the data storage node.

The data storage node, DHT index node, DHT super maintenance node and front end node may be mapped into independent physical devices or any combination of the functions may be located in one physical device, or they exist in one physical device as independent processes or as one process.

Figure 7:
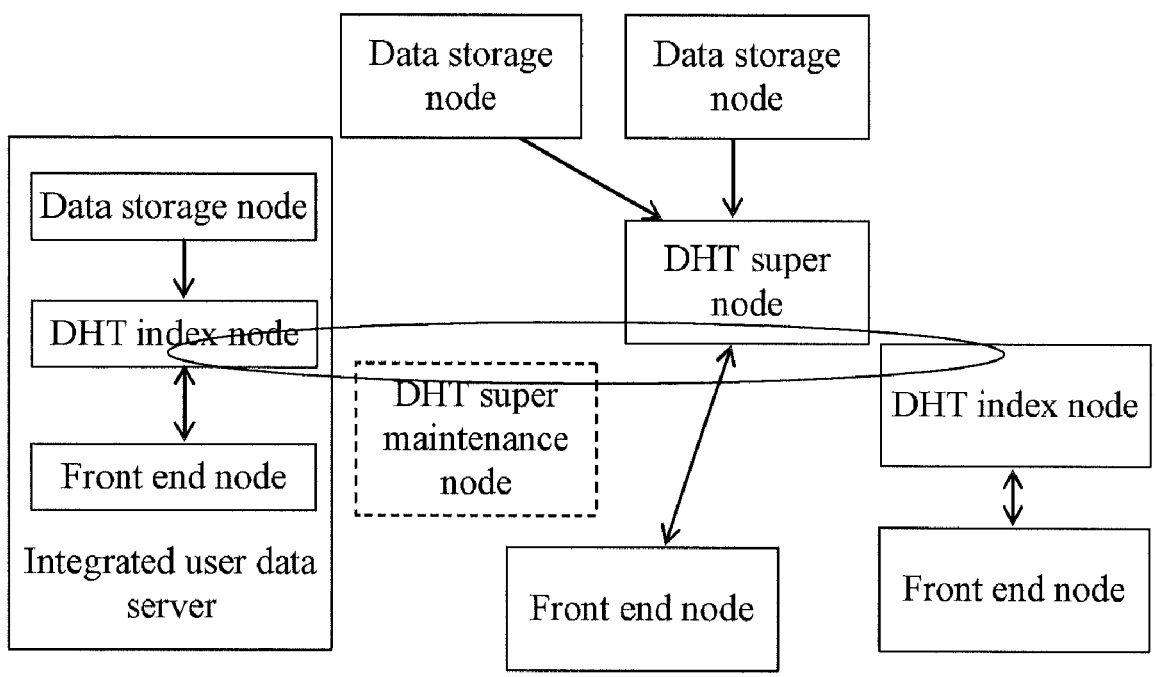
FIG. 7 is a schematic diagram of a network where multiple forms of distributed user data server related devices are deployed according to an embodiment of the present invention.

In practice, different physical devices can be deployed in a network, as shown in FIG. 7. Thus, the networking is more flexible and the scalability is better. For example, when the capability of signaling processing is insufficient, it is necessary to add only front end nodes. If it is necessary to expand only the capacity of user data storage, storage nodes can be directly added. When it is necessary to improve the processing capability of the DHT network, DHT index nodes can be directly added. In addition, an embodiment of the present invention provides a distributed user data storage system where every node is in connection with multiple nodes. For example, one front end node can access the DHT network via multiple DHT index nodes; one data storage node can register with multiple DHT index nodes. Thereby, the single-point failure and load imbalance resulting from centralized storage are avoided. The system is more reliable. Furthermore, because the distributed architecture reduces the requirements on each device, the cost-effectiveness is high.

The technical solution provided in the embodiments of the present invention can effectively solve the issues that existing user data servers with centralized storage are faced with. The user data server is not centralized and is highly scalable and highly reliable with a high cost-effectiveness.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (such as a personal computer, a server, or a network device) to perform the methods provided in each embodiment of the present invention.

What is claimed is:

1. A user data server system, comprising:
   a data storage node, configured to store user data, register the user data in a Distributed Hash Table, DHT, network by using a key, and receive and process user data operation requests;
   a DHT index node, configured to create and maintain DHT routing information according to a DHT algorithm, store, according to the key, information of data storage nodes wherein user data is stored, and search for, according to the key, information of a data storage node wherein target user data is stored;

a DHT super maintenance node, configured to manage and optimize the DHT network; and a front end node, capable of protocol processing and service processing, and configured to obtain a key associated with a target user and obtain information of a data storage node where the target user data is stored by querying the DHT index node, via the DHT network according to the key, and perform operations on the user data stored in the data storage node where the target user data is stored, wherein the DHT index node comprises:

a DHT constructing module, configured to create and maintain DHT routing information according to a DHT algorithm;

a DHT index module, configured to receive a registration request from the data storage node and store information of the data storage node where user data is stored; and a DHT route searching module, configured to receive a query request from the front end node or another DHT index node and search for a node ID closest to the key in the DHT routing information, if the closest node ID is a local node ID, search for a target index in the DHT index module and send information of the data storage node where the target user data is stored to the front end node; and if the closest node ID is not the local node ID, send a DHT query request to the DHT index node associated with the closest node ID.

2. The system according to claim 1, wherein the DHT super maintenance node is further configured to allocate IDs for DHT nodes; or monitor the status of DHT nodes in a served area; or receive update routing information of DHT nodes in its controlled area, forward the update routing information to super maintenance nodes in other areas, receive update routing information from other super maintenance nodes, and notify DHT nodes in its controlled area to update routing information; or check load conditions of nodes in its controlled area by sampling load conditions and realize load balance by specifying join positions of new nodes.

3. The system according to claim 1, wherein the front end node comprises:

a protocol processing module, configured to perform protocols between a user data server and a function entity;

a service processing module, configured to perform service processing in a scenario in which the user data server processes services, act as a client node in the DHT network to obtain information of a data storage node where the target user data is stored via a DHT query, and perform operations on the user data stored in the data storage node.

4. A method for requesting a user data operation, comprising:

receiving, by a front end node, a service request, performing protocol processing and service processing, and obtaining a key associated with a target user;

acting, by the front end node, as a client node in a DHT network to initiate a key-based Distributed Hash Table query request to a DHT index node connected with the front end node and receiving information of a data storage node where target user data is stored from the DHT index node; and sending, by the front end node, a user data operation request to the data storage node according to the information of the data storage node where the target user data is stored, wherein the receiving of information of a data storage node where target user data is stored from the DHT index node comprises:

searching for, by the DHT index node, a node ID closest to the key in DHT routing information;

if the node ID is the ID of the local node, searching for a target index in the indexes stored in the DHT index node and sending information of the data storage node where the user data is stored to the front end node;

if the node ID is not the ID of the local node, initiating a DHT query to a DHT index node associated with the node ID closest to the key.

5. The method according to claim 4, wherein the obtaining a key associated with a target user comprises:

obtaining an ID of the target user of the service request and obtaining a key according to the user ID.

6. The method according to claim 4, wherein, the receiving a service request, performing protocol processing and service processing, and obtaining a key associated with a target user comprises the request is from a Mobile Switching Center, MSC, Gateway Mobile Switching Centre, GMSC, Serving GPRS Support Node, SGSN, or Gateway GPRS Support Node, GGSN, that interacts with a Home Location Register, HLR; or the request is from an Interrogating-Call/Session Control Function, I-CSCF, or a Serving-Call/Session Control Function, S-CSCF, that has interactions with an Home Subscriber Server, HSS.

7. The method according to claim 4, further comprising:

performing an operation, by the data storage node, according to the user data operation request;

sending, by the data storage node, a user data operation response to the front end node;

by the front end node, receiving the user data operation response from the data storage node, performing subsequent service processing and protocol processing, and sending a corresponding service response to a requesting function entity.

* * * * *